(12) United States Patent
Sung et al.

(10) Patent No.: US 7,357,536 B2
(45) Date of Patent: Apr. 15, 2008

(54) BACKLIGHT UNIT AND METHOD FOR CONTROLLING TEMPERATURE THEREOF

(75) Inventors: Moon Chul Sung, Seoul (KR); Kyu Tae Lee, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 46 days.

(21) Appl. No.: 11/320,462

(22) Filed: Dec. 29, 2005

(65) Prior Publication Data

US 2007/0002589 A1 Jan. 4, 2007

(30) Foreign Application Priority Data

Jun. 30, 2005 (KR) ................ 10-2005-0058618

(51) Int. Cl.
*F21V 5/00* (2006.01)
(52) U.S. Cl. ............... 362/332; 362/632; 362/633
(58) Field of Classification Search ....... 362/630–634; 219/522, 540–541; 313/56–59
See application file for complete search history.

(56) References Cited

FOREIGN PATENT DOCUMENTS

DE   10 2004 037 039 A1   6/2005

JP   2003-015130   1/2003

*Primary Examiner*—Sandra O'Shea
*Assistant Examiner*—Jason Moon Han
(74) *Attorney, Agent, or Firm*—McKenna Long & Aldridge LLP

(57) ABSTRACT

A backlight unit for effectively controlling a heat absorption operation required under a high temperature condition and a heat emission operation required under a low temperature condition to increase lamp performance and lamp lifespan, and achieve an enhanced initial brightness increase effect includes: a cover bottom including a first portion, a second portion spaced apart from the first portion, and a third portion connecting the first and second portions; a lamp arranged at the first portion of the cover bottom; and a current direction controller connected to the first and second portions and adapted to control a direction of current supplied to the cover bottom according to a Thomson's coefficient of the cover bottom. A method for controlling a temperature of a backlight unit includes controlling the direction of current supplied to the cover bottom according to a Thomson's coefficient of the cover bottom to emit or absorb heat.

26 Claims, 6 Drawing Sheets

BACKLIGHT UNIT AND METHOD FOR CONTROLLING TEMPERATURE THEREOF

This application claims the benefit of Korean Patent Application No. P2005-0058618, filed on Jun. 30, 2005, which is hereby incorporated by reference as if fully set forth herein.

BACKGROUND OF THE INVENTION

1. Field of the Invention

The present invention relates to a backlight unit, and more particularly, to a backlight unit that uses the Thomson effect to achieve an enhanced heat discharge efficiency and an enhanced heating efficiency.

2. Discussion of the Related Art

Cathode ray tubes (CRT) have been generally used as the display systems for equipment such as televisions, monitors of metering devices, and data terminal equipment. However, such CRTs have a heavy and bulky structure that makes them unsuitable for appliances requiring a light and compact display.

Various alternative display devices have been developed to substitute for the CRT as displays when the size and weight limitations of CRT based displays do not provide the compactness and lightness desired for an appliance. Such display devices include the liquid crystal display (LCD) using an electro-optical effect, the plasma display panel (PDP) using gas discharge, and electro-luminescent (EL) displays using electro-luminescent phosphors. In particular, research on LCDs is being actively pursued.

Because LCDs have the advantages of compactness, lightness and low power consumption they have been actively developed as a substitute for CRTs. Recently, the development of LCDs has sufficiently advanced to enable LCDs to function effectively as flat panel display devices. As a result, LCDs are used not only for monitors of laptop computers, but also for monitors of desktop computers and other large-size information display devices, thus greatly increasing the demand for LCDs.

Most LCDs use the controlled transmission of light to generate a displayed image. Because the LCD does not itself emit light, a separate, external light source, namely, a backlight unit is required to illuminate the LCD.

Generally, backlight units are classified as either edge type or direct type in accordance with the arrangement of the cylindrical fluorescent lamp or lamps.

In the edge type backlight unit, a lamp unit is arranged at one side of a light guide plate. The lamp unit includes a lamp that emits light, lamp holders that are fitted around opposite ends of the lamp to hold the lamp, and a lamp-side reflection plate fitted into one side of the light guide plate such that the reflection plate surrounds an outer peripheral surface of the lamp and reflects the light emitted from the lamp toward the light guide plate.

The edge type backlight unit is primarily used with LCDs having a relatively small size, such as an LCD used as the monitor of a laptop computer or desktop computer. The edge type backlight unit exhibits excellent light uniformity, has a long lifespan and has an advantageous slim profile.

On the other hand the direct type backlight unit has actively been developed concurrently with the development of LCDs having a size of 20 inches or more. In the direct type backlight unit, a plurality of lamps are arranged in an aligned manner beneath a diffusion plate such that the lamps directly radiate light unto a front surface of an LCD panel.

The direct type backlight unit is mainly used in large-size LCD devices requiring high brightness because the direct type backlight unit exhibits a high light use efficiency compared to that of the edge type backlight unit.

However, where the direct type backlight unit is applied to a large-size LCD device such as the display of a large-size monitor or television, the operating time of the backlight unit and the number of lamps used in the backlight unit are increased compared to the operating time and number of lamps in used in the edge type backlight unit of the monitor of a laptop computer. The larger number and greater operating time of the lamps in the direct type backlight arrangement results in an increased possibility of lamp failure and in a reduced lifespan of the lamps.

For either the edge type or the direct type LCD backlight an EL lamp, a light emitting diode (LED), a cold cathode fluorescent lamp (CCFL), a hot cathode fluorescent lamp (HCFL), or an external electrode fluorescent lamp (EEFL) may be used.

Hereinafter, a backlight unit in accordance with the related art will be described with reference to FIGS. 1, 2, and 3.

As shown in FIG. 1, the related art edge type backlight unit includes a cover bottom 1, a lamp or lamps 2 arranged above the cover bottom 1 at one side or either side of the cover bottom 1, and a lamp housing 3 that encloses the lamp 2 except for a an open light emission face to allow light from the lamp 2 to exit the lamp housing 3.

Although not shown, the edge type backlight unit also includes a light guide plate that guides light emitted from the lamp 2, reflecting the emitted light toward an LCD panel; a diffusion sheet that diffuses the light emerging upwardly from the light guide plate through a certain angle; a prism sheet that condenses the diffused light and transmits the condensed light to the LCD panel; and a bottom-side reflection plate that upwardly reflects light transmitted to the cover bottom 1, in order to minimize loss of light. A plurality of diffusion sheets may be used as required.

Where the lamp 2 is arranged at either side of the cover bottom 1, the backlight unit may be used in a monitor. On the other hand, where the lamp 2 is arranged at one side of the cover bottom 1, the backlight unit may be used in a notebook computer. Although the lamp 2 is shown in FIG. 1 to have a straight structure, the lamp 2 may have an L-shaped or U-shaped structure.

In the edge type backlight unit of FIG. 1, the temperature of the lamp 1 and the temperature of a light incidence region to which light emitted from the lamp 1 is directed increase during continuous driving of the lamp 1.

FIGS. 2 and 3 show in detail the temperature profile of the lamp and the light incidence region designated by "A" and the region designated "B" spaced away from the lamp. The illumination from the lamp results in Region "A" having a higher temperature than region "B".

Increased temperatures of the lamp 1 and of the light incidence region accompany the overheating of the lamp from continuous driving of the lamp and result in a degradation of the performance of the lamp a reduction in the lifespan of the lamp.

SUMMARY OF THE INVENTION

Accordingly, the present invention is directed to a backlight unit and a method for controlling the temperature thereof that substantially obviate one or more problems due to limitations and disadvantages of the related art.

An advantage of the present invention is to provide a backlight unit that can effectively control a heat absorption operation required during a high temperature condition and a heat absorption operation required during a low temperature condition, thereby solving problems associated with lamp performance and lamp lifespan, and achieving an enhanced initial brightness effect.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings. To achieve these objects and other advantages and in accordance with the purpose of the invention, as embodied and broadly described herein, a backlight unit includes: a cover bottom including a first portion, a second portion spaced apart from the first portion, and a third portion connecting the first and second portions; a lamp arranged at the first portion of the cover bottom; and a current direction controller that is connected to the first and second portions and that controls a direction of current supplied to the cover bottom according to a Thomson's coefficient of the cover bottom.

In another aspect of the present invention, in a method for controlling a temperature of a backlight unit including: a cover bottom including a first portion, a second portion spaced apart from the first portion, and a third portion connecting the first and second portions; a lamp arranged at the first portion of the cover bottom; and a current direction controller that is connected to the first and second portions and that controls a direction of current supplied to the cover bottom according to a Thomson's coefficient of the cover bottom, the method includes controlling the direction of the current such that the current flows in the cover bottom from a lower temperature side to a higher temperature side or from the higher temperature side or the lower temperature side, using the current direction controller in accordance with whether the Thomson's coefficient of the cover bottom is positive (+) or negative (−), when a temperature gradient is generated in the cover bottom.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, that are included to provide a further understanding of the invention and are incorporated in and constitute a part of this application, illustrate embodiment(s) of the invention and together with the description serve to explain the principle of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

The backlight unit according to the present invention includes a cover bottom defined by first, second and third portions thereof, and a current direction controller connected between the first and second portion of the cover bottom to control the supply of current and the supply direction of the current.

In addition to the above-described configuration, the backlight unit according to the present invention includes a light guide plate that guides light emitted from a lamp such that the light is reflected toward an LCD panel; a diffusion sheet that diffuses the light emerging upwardly from the light guide plate through a certain angle; a prism sheet that condenses the diffused light, and transmits the condensed light to the LCD panel; and a bottom-side reflection plate that upwardly reflects light transmitted to the cover bottom; in order to minimize loss of light. The backlight unit may include a plurality of diffusion sheets.

The first, second, and third portions of the cover bottom form a closed loop. The first portion is a cover bottom portion arranged adjacent to a region where the lamp is arranged. The second portion is a cover bottom portion spaced apart from the region where the lamp is arranged. The third portion is a connecting portion that connects the first and second portions. The connecting portion, namely, the third portion, has a small area so that a maximum temperature gradient is exhibited at the third portion.

The first and second portions are spaced apart from each other in a region where the cover bottom is arranged, except for a region where the third portion, namely, the connecting portion, is arranged. Thus, the cover bottom forms a loop closed by the connecting portion.

The lamp may have a straight shape, an L shape, or a U shape. Irrespective of the shape of the lamp, the portion of the cover bottom arranged adjacent to the lamp is defined as the first portion, the portion of the cover bottom spaced apart from the lamp is defined as the second portion, and the portion of the cover bottom connecting the first and second portions is defined as the third portion. The first portion may have a straight shape, an L shape or a U shape.

Hereinafter, the backlight unit will be described in conjunction with exemplary embodiments of the present invention associated with use of lamps having various shapes.

Figure 1:
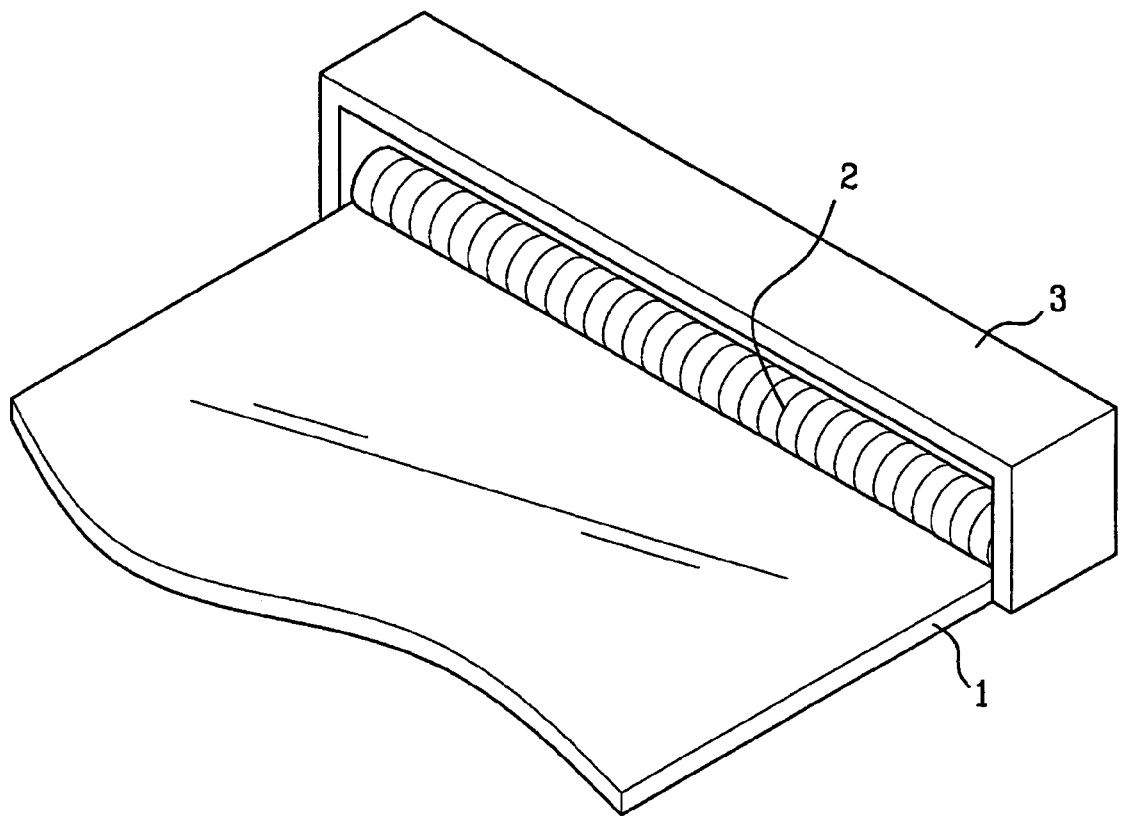
FIG. 1 is a perspective view of a related art edge type backlight unit.
Figure 2:
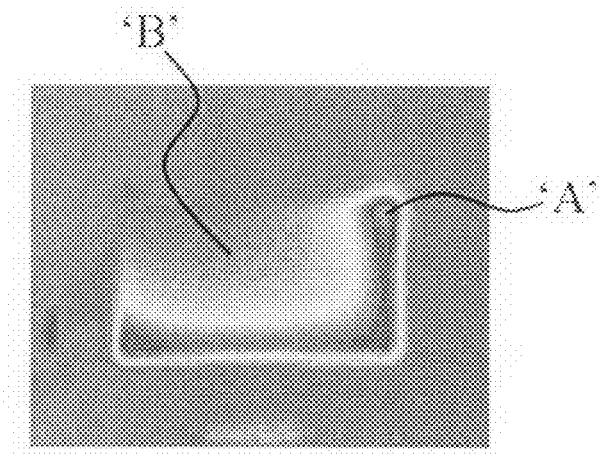
FIGS. 2 and 3 are photographs showing temperature distributions in the related art L-shaped and U-shaped backlight units, respectively.
Figure 3:
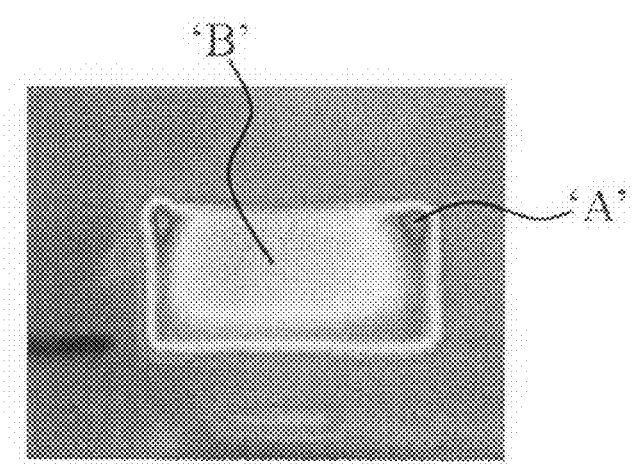
Figure 4:
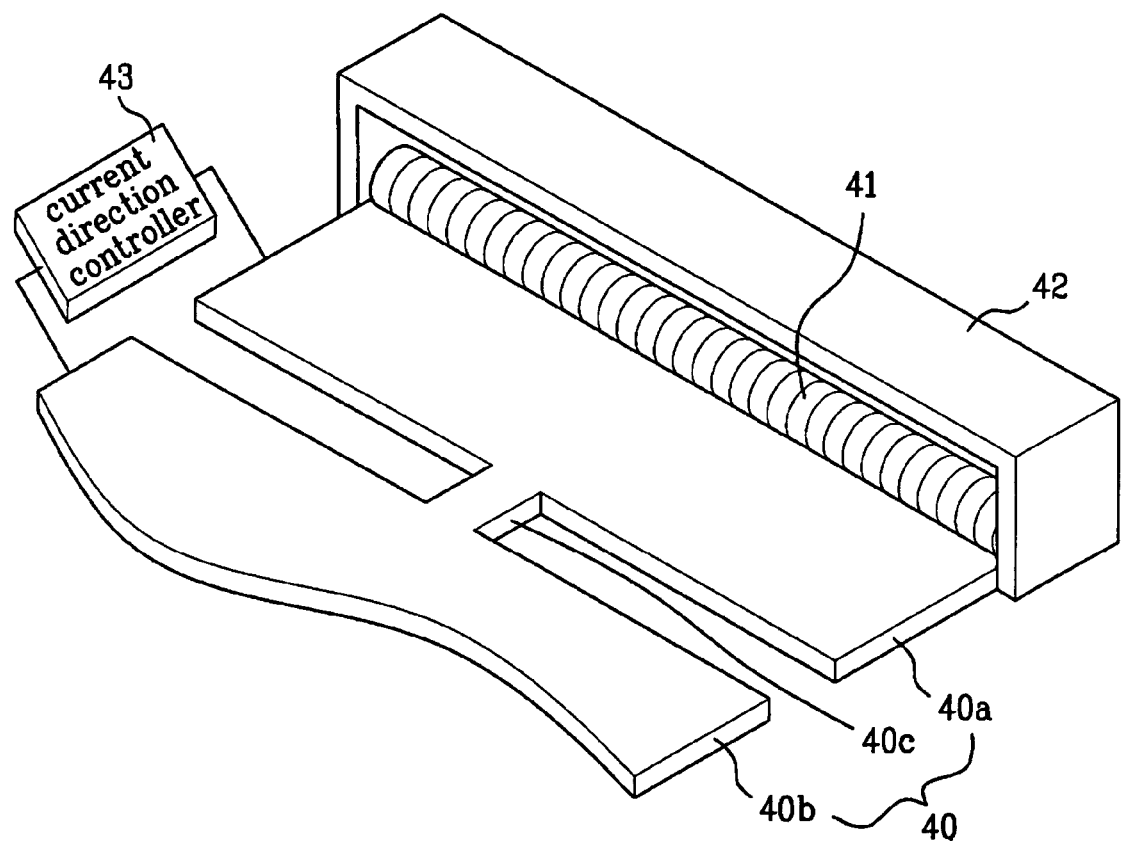
FIG. 4 is a perspective view of a backlight unit according to a first embodiment of the present invention.
Figure 5:
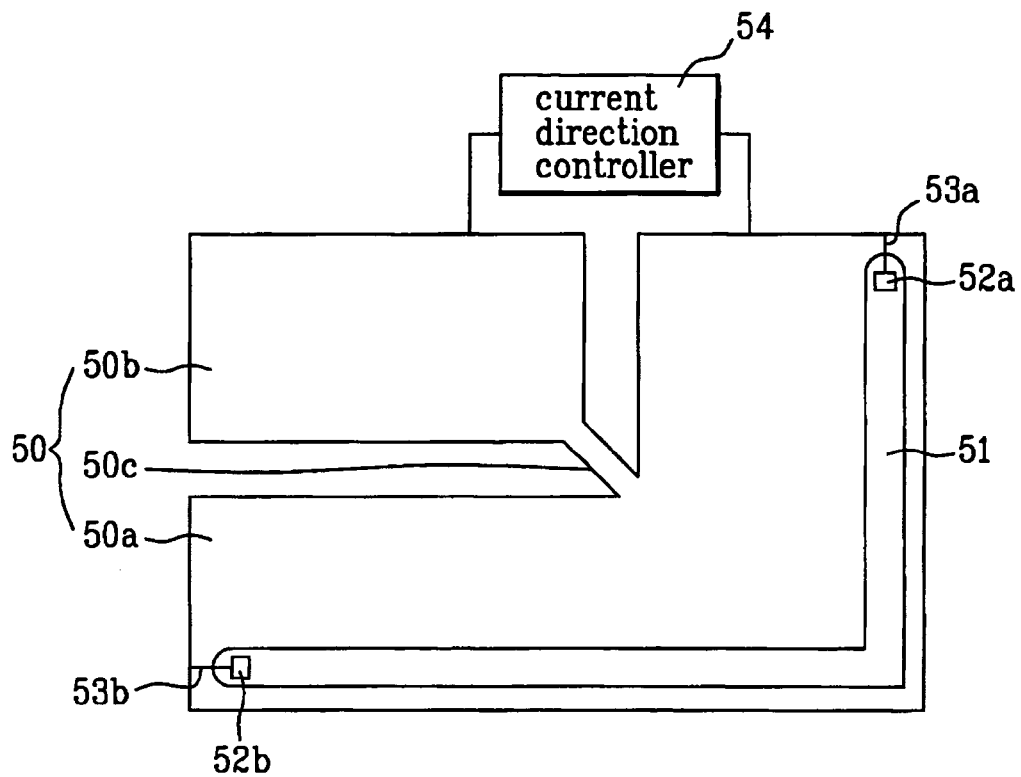
FIG. 5 is a plan view of a backlight unit according to a second embodiment of the present invention.
Figure 6:
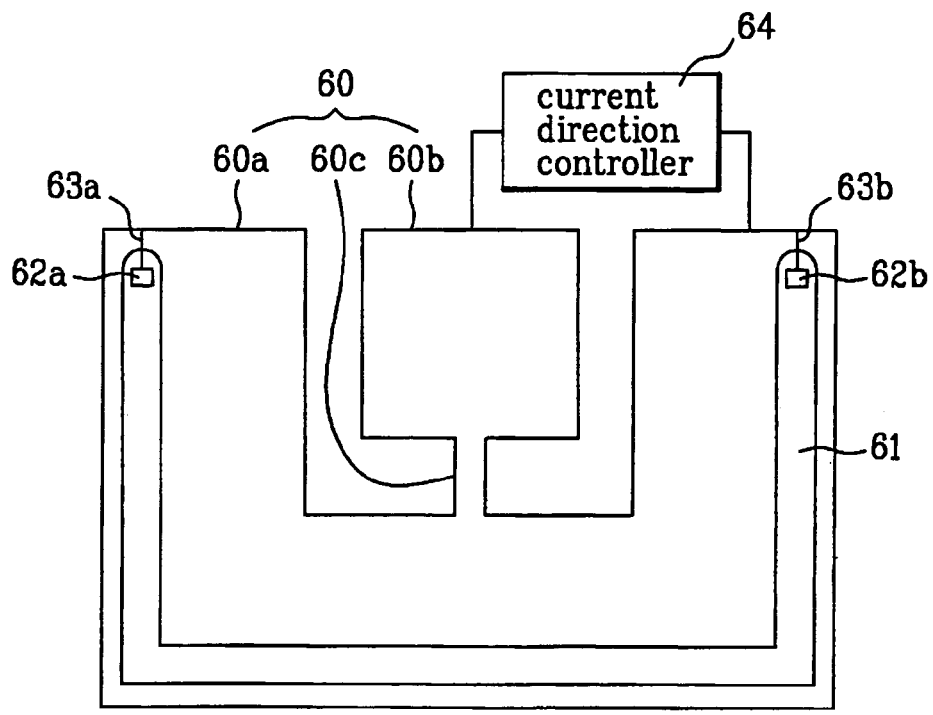
FIG. 6 is a plan view of a backlight unit according to a third embodiment of the present invention.

FIG. 4 is a perspective view of a backlight unit according to a first embodiment of the present invention. FIG. 5 is a plan view of a backlight unit according to a second embodiment of the present invention. FIG. 6 is a plan view of a backlight unit according to a third embodiment of the present invention.

Figure 7:
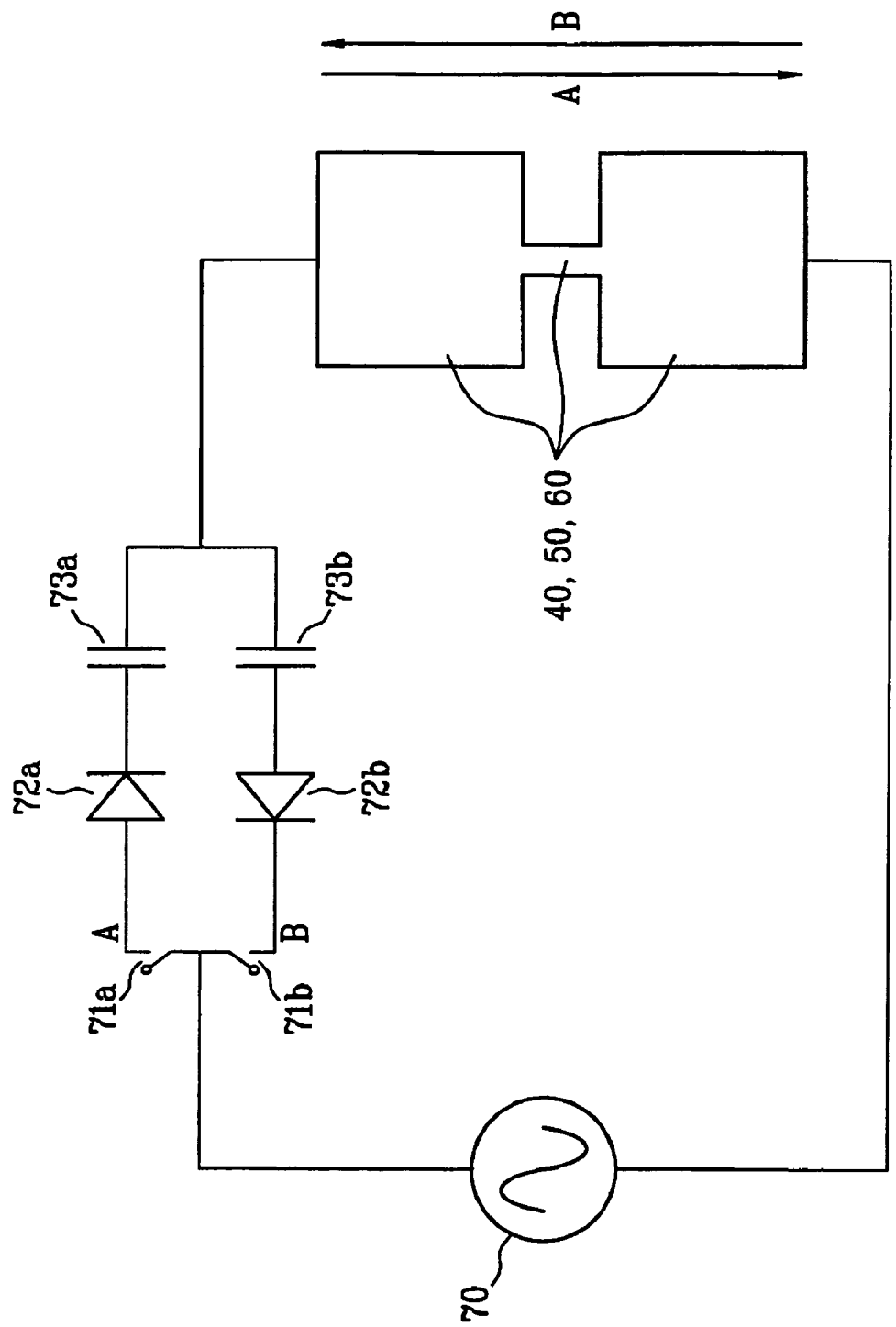
FIG. 7 is a circuit diagram illustrating a current direction controller and a cover bottom as shown in each of FIGS. 4, 5, and 6.

FIG. 7 is a circuit diagram illustrating a current direction controller and a cover bottom shown in each of FIGS. 4, 5, and 6.

First, the backlight unit according to the first embodiment of the present invention will be described.

Figure 8:
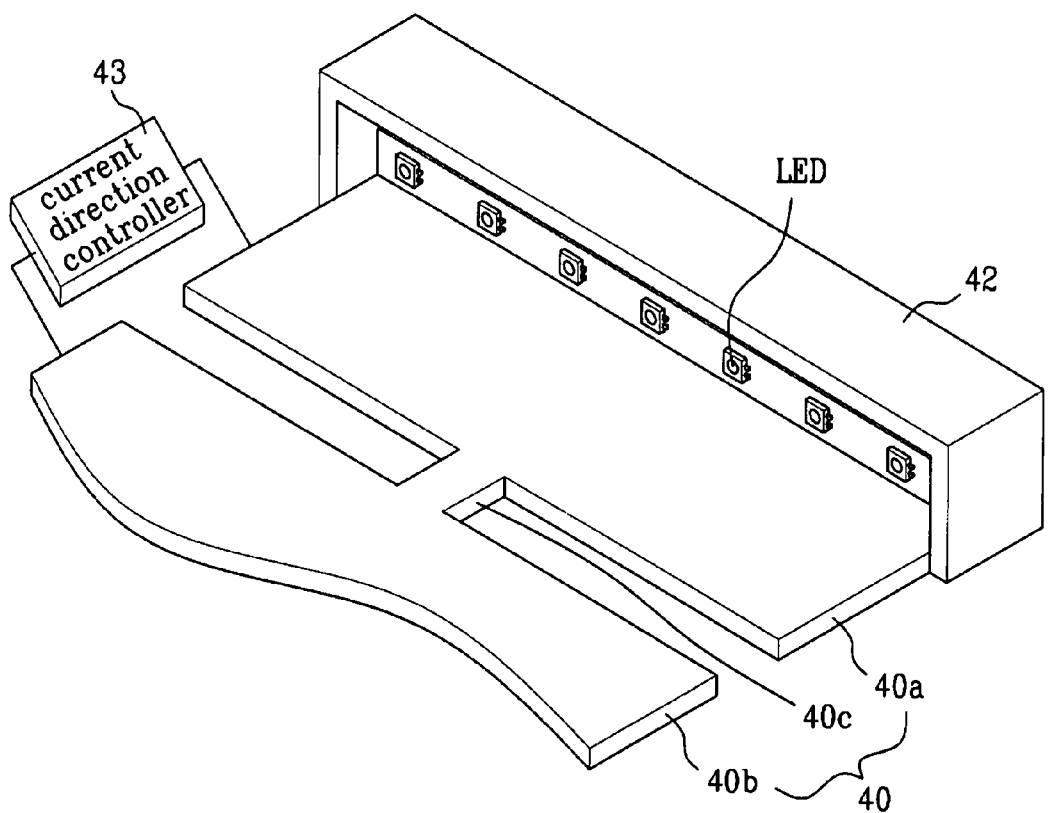
FIG. 8 is a perspective view of a backlight unit including light emitting diodes (LEDs) according to embodiments of the present invention.

As shown in FIG. 4, the backlight unit according to the first embodiment of the present invention includes a cover bottom 40 that is divided into first, second, and third portions 40a, 40b, and 40c forming a closed loop, a lamp 41 that is arranged at one side or either side of the cover bottom 40, and has a straight structure, and a lamp housing 42 that encloses the lamp 41, except for a light emission face of the lamp 41. The first portion 40a may have a straight shape. The lamp 41 is arranged at an edge of the first portion 40a that is spaced apart from the second portion 40b. The lamp 41 may be a CCFL or may include LEDs as shown in FIG. 8. The backlight unit also includes a current direction controller 43 that is connected between the first and second portions 40a and 40b, to control the supply of current and the supply direction of the current.

The backlight unit according to the first embodiment of the present invention, in addition to the above-described configuration, includes a light guide plate that guides light emitted from the lamp 41 such that the light is reflected toward an LCD panel; a diffusion sheet that diffuses the light emerging upwardly from the light guide plate through a certain angle, a prism sheet that condenses the diffused light, and transmits the condensed light to the LCD panel; and a bottom-side reflection plate that upwardly reflects light transmitted to the cover bottom 40, in order to minimize loss of light. The backlight unit may include a plurality of diffusion sheets.

In addition to the above-described configuration, in order to reduce loss of the light emitted from the lamp 41 to a light incidence face of the light guide plate, the backlight unit further includes a lamp-side reflection plate that surrounds the outside of the lamp 41, except for the light incidence face of the light guide plate, and lamp holders that are arranged at opposite ends of the lamp 41 to hold the lamp 41 at a desired position and to prevent the lamp 41 from extending excessively into a portion of the light guide plate corresponding to a region where the lamp 41 is arranged.

Where the lamp 41 is arranged at either side of the light guide plate, the backlight unit may be used in a monitor. On the other hand, where the lamp 41 is arranged at one side of the light guide plate, the backlight unit may be used in a notebook computer.

In the backlight unit having the above-described configuration, the first portion 40a of the cover bottom 40 is a cover bottom portion arranged adjacent to the region where the lamp 41 is arranged. The second portion 40b is a cover bottom portion spaced apart from the region where the lamp 41 is arranged. The third portion 40c is a connecting portion that connects the first and second portions 40a and 40b.

The first and second portions 40a and 40b are spaced apart from each other in a region where the cover bottom 40 is arranged, except for a region where the third portion 40c, namely, the connecting portion, is arranged. Thus, the cover bottom 40 has an integrated structure forming a loop closed by the connecting portion.

Now, a backlight unit according to a second embodiment of the present invention will be described.

As shown in FIG. 5, the backlight unit according to the second embodiment of the present invention includes a cover bottom 50 that is divided into first, second, and third portions 50a, 50b, and 50c forming a closed loop; a lamp 51 that extends along two edges of the first portion 50a of the cover bottom 50, and has an L-shaped structure; and a lamp housing that encloses the lamp 51, except for a light emission face of the lamp 51. The first portion 50a may have an L shaped structure. The lamp may be a CCFL or may include LEDs. The backlight unit also includes a current direction controller 54 that is connected between the first and second portions 50a and 50b, to control the supply of current and the supply direction of the current.

The backlight unit according to the second embodiment of the present invention, in addition to the above-described configuration, includes a light guide plate that guides light emitted from the lamp 51 such that the light is reflected toward an LCD panel; a diffusion sheet that diffuses the light emerging upwardly from the light guide plate through a certain angle; a prism sheet that condenses the diffused light, and transmits the condensed light to the LCD panel; and a bottom-side reflection plate that upwardly reflects light transmitted to the cover bottom 50, in order to minimize loss of light. The backlight unit may include a plurality of diffusion sheets.

In addition to the above-described configuration, in order to reduce loss of the light emitted from the lamp 51 to a light incidence face of the light guide plate, the backlight unit further includes a lamp-side reflection plate that surrounds the outside of the lamp 51, except for the light incidence face of the light guide plate, and lamp holders that are arranged at opposite ends of the lamp 51 to hold the lamp 51 at a desired position and to prevent the lamp 51 from extending excessively into a portion of the light guide plate corresponding to a region where the lamp 51 is arranged.

In the backlight unit having the above-described configuration, the first portion 50a of the cover bottom 50 is a cover bottom portion arranged adjacent to the region where the L-shaped lamp 51 is arranged. The second portion 50b is a cover bottom portion diagonally spaced apart from the region where the lamp 51 is arranged. The third portion 50c is a connecting portion that connects the first and second portions 50a and 50b.

The first and second portions 50a and 50b are spaced apart from each other in a region where the cover bottom 50 is arranged, except for a region where the third portion 50c, namely, the connecting portion, is arranged. Thus, the cover bottom 50 has an integrated structure forming a loop closed by the connecting portion.

Next, a backlight unit according to a third embodiment of the present invention will be described.

As shown in FIG. 6, the backlight unit according to the third embodiment of the present invention includes: a cover bottom 60 that is divided into first, second, and third portions 60a, 60b, and 60c forming a closed loop; a lamp 61 that extends along three edges of the first portion 60a of the cover bottom 60, and has a U-shaped structure; and a lamp housing that encloses the lamp 61, except for a light emission face of the lamp 61. The first portion 60a may have a U shaped structure. The backlight unit also includes a current direction controller 64 that is connected between the first and second portions 60a and 60b, to control the supply of current and the supply direction of the current. The lamp 61 may be a CCFL or may include LEDs.

The backlight unit according to the third embodiment of the present invention, in addition to the above-described configuration, includes a light guide plate that guides light emitted from the lamp 61 such that the light is reflected toward an LCD panel; a diffusion sheet that diffuses the light emerging upwardly from the light guide plate through a certain angle; a prism sheet that condenses the diffused light, and transmits the condensed light to the LCD panel; and a bottom-side reflection plate that upwardly reflects light transmitted to the cover bottom 60, in order to minimize loss of light. The backlight unit may include a plurality of diffusion sheets.

In addition to the above-described configuration, in order to reduce loss of the light emitted from the lamp 61 to a light incidence face of the light guide plate, the backlight unit further includes a lamp-side reflection plate that surrounds the outside of the lamp 61, except for the light incidence face of the light guide plate, and lamp holders that are arranged at opposite ends of the lamp 61 to hold the lamp 61 at a desired position and to prevent the lamp 61 from extending excessively into a portion of the light guide plate corresponding to a region where the lamp 61 is arranged.

In the backlight unit having the above-described configuration, the first portion 60a of the cover bottom 60 is a cover bottom portion arranged adjacent to the region where the U-shaped lamp 61 is arranged. The second portion 60b is a cover bottom portion spaced apart from the region where the lamp 61 is arranged, namely, the three edges of the cover bottom 60. Namely, the second portion 60b is the remaining edge of the cover bottom 60. The third portion 60c is a connecting portion that connects the first and second portions 60a and 60b.

The first and second portions 60a and 60b are spaced apart from each other in a region where the cover bottom 60 is arranged, except for a region where the third portion 60c, namely, the connecting portion, is arranged. Thus, the cover bottom 60 has an integrated structure forming a loop closed by the connecting portion.

The lamp 61 may be a CCFL. The lamp 61 includes a tube, and first and second inner electrodes 62a and 62b respectively arranged within the tube at opposite ends of the tube. When a drive voltage is applied to the first and second inner electrodes 62a and 62b, the lamp 61 emits light. First and second voltage supply lines 63a and 63b are connected to the first and second inner electrodes 62a and 62b, respectively, to supply the drive voltage for the lamp 61.

As shown in FIG. 7, each of the current direction controllers 43, 54, and 64 respectively included in the backlight units according to the first, second and third embodiments of the present invention includes a power source 70; a first diode 72a and a first capacitor 73a that are arranged in a first path; a second diode 72b and a second capacitor 73b that are arranged in a second path; and a first switch 71a and a second switch 71b that are adapted to select the first path and the second path, respectively.

The first and second paths are connected in parallel under the condition in that both the first and second switches 71a and 71b are in a connected or ON state. The first and second diodes 72a and 72b are arranged such that they allow the flow of current in opposite directions.

Each of the current direction controllers 43, 54, and 64 is connected between opposite ends of the first and second portions of an associated one of the cover bottoms 40, 50, and 60 respectively shown in FIGS. 4, 5, and 6.

When the first switch 71a is turned on, current flows in the first path, namely, path A, via the first diode 72a and first capacitor 73a. On the other hand, when the second switch 71b is turned on, current flows in the second path, namely, path B, via the second diode 72b and second capacitor 73b.

The cover bottoms 40, 50, and 60 of the backlight units according to the first, second, and third embodiments of the present invention may be made of a material such as iron (Fe), copper (Cu), platinum (Pt), or silver (Ag), taking costs, workability and weight into consideration.

For reference, the melting points, boiling points, and specific gravities of Fe, Cu, Pt, and Ag are described in the following Table 1.

TABLE 1

| Symbols of Atoms | Melting Point (° C.) | Boiling Point (° C.) | Specific Gravity (at 20° C.) |
| --- | --- | --- | --- |
| Fe | 1,535 | 2,750 | 7.86 |
| Cu | 1,084.5 | 2,595 | 8.92 |
| Pt | 1,772 | 3,827 | 21.45 |
| Ag | 961.9 | 2,212 | 10.49 |

The purpose for dividing each of the cover bottoms 40, 50, and 60 into first, second, and third portions in accordance with the shape of the lamp, and the current direction controller 43, 54, or 64 is arranged at the second portion, as in the first, second, or third embodiment of the present invention is to generate heat absorption or heat emission in the cover bottom 40, 50 or 60 in accordance with the Thomson effect generated through appropriate control of the direction of current flowing through the cover bottom 40, 50, or 60 when there is a temperature difference among the portions of the cover bottom due to the arrangement of the lamp relative to the cover bottom, and thus, to appropriately control the temperatures of the portions of the cover bottom 40, 50, or 60.

The Thomson effect is a phenomenon that, when current flows in a conductor with a temperature gradient, causes heat to be emitted or absorbed from the conductor in addition to the Joules heat generated by the current flow.

The amount of heat (Q) generated in accordance with the Thomson effect can be expressed by the following Expression 1:

$$dQ = I \cdot \alpha (\Delta T \cdot x) dx \qquad \text{A. [Expression 1]}$$

where, "I" represents the intensity of current, "α" represents a Thomson's coefficient, and "ΔT" represents a temperature difference between the first and second portions.

Fe and Pt, of which the cover bottom may be made, have positive Thomson's coefficients. Cu and Ag, of which the cover bottom may be made, have positive Thomson's.

Hereinafter, a method for controlling the temperature of the backlight unit having the above-described configuration will be described. For convenience, the following description will be given in conjunction with one of the cover bottoms 40, 50, and 60 according to the first, second, and third embodiments of the present invention, without designating the cover bottom by any reference numeral.

First, when a temperature gradient is generated in the cover bottom where the lamp is arranged, current is applied to the cover bottom.

The direction of current applied to the first and second portions of the cover bottom in response to the generation of the temperature gradient in the bottom cover is controlled using the current direction controller 43.

The direction of current is controlled to cause current to flow from a lower temperature side to a higher temperature side or from the higher temperature side to the lower temperature side in the cover bottom in accordance with whether the Thomson's coefficient of the cover bottom is positive (+) or negative (−), and thus, to cause the cover bottom to absorb or emit heat.

First, heat absorption and heat emission of the cover bottom will be described in conjunction with the case in which the cover bottom has a positive Thomson's coefficient.

Where the cover bottom is made of a material having a positive Thomson's coefficient, heat is emitted from the cover bottom when current is supplied to the bottom cover in a direction from the lower temperature side to the higher temperature side, namely, from the second portion to the first portion.

When heat is emitted from the cover bottom, as described above, a heat emission effect is generated. The heat emission from the cover bottom increases the temperature of the light incidence region to which light emitted from the lamp producing an enhancement in initial brightness during a low temperature condition.

That is, when the temperature of the backlight unit is low, and the Thomson's coefficient of the cover bottom is positive, current is supplied to the cover bottom in a direction from the second portion to the first portion.

On the other hand, when current is supplied to the bottom cover in a direction from the higher temperature side to the lower temperature side, namely, from the first portion to the second portion in the case in which the cover bottom is made of a material having a positive Thomson's coefficient, the cover bottom absorbs heat. In this case, accordingly, a heat absorption effect is generated.

When heat absorption occurs in the cover bottom, as described above, the temperature of the light incidence region to which light emitted from the lamp is incident is decreased. Accordingly, it is possible to prevent the lamp from being overheated, and thus, to eliminate problems of a degradation in the performance of the lamp and a reduction in the lifespan of the lamp.

That is, when the temperature of the backlight unit is high, and the Thomson's coefficient of the cover bottom is positive, current is supplied to the cover bottom in a direction from the first portion to the second portion.

Next, heat absorption and heat emission of the cover bottom will be described in conjunction with the case in which the cover bottom has a negative Thomson's coefficient.

Where the cover bottom is made of a material having a negative Thomson's coefficient, the cover bottom absorbs heat when current is supplied to the bottom cover in a direction from the lower temperature side to the higher temperature side. On the other hand, when current is supplied to the bottom cover in a direction from the higher temperature side to the lower temperature side, the cover bottom emits heat.

That is, when the temperature of the backlight unit is high, and the Thomson's coefficient of the cover bottom is negative, current is supplied to the cover bottom in a direction from the lower temperature side to the higher temperature side, namely, from the second portion to the first portion, to induce heat absorption.

On the other hand, when the temperature of the backlight unit is low, and the Thomson's coefficient of the cover bottom is negative, current is supplied to the cover bottom in a direction from the higher temperature side to the lower temperature side, namely, from the first portion to the second portion, to induce heat emission.

Thus, it is possible to reduce a temperature gradient generated in the cover bottom by controlling the direction of current supplied to the first and second portions of the cover bottom in accordance with the arrangement of the lamp relative to the cover bottom and the Thomson's coefficient of the cover bottom.

As apparent from the above description, the backlight unit and the method for controlling the same in accordance with the present invention provide various effects.

That is, where the cover bottom of the backlight unit is appropriately divided into first, second, and third portions forming a closed loop, in accordance with the arrangement of the lamp relative to the cover bottom, heat absorption or heat emission occurs in the cover bottom when current is applied to the cover bottom under the condition in which the direction of current applied to the first portion of the cover bottom arranged adjacent to the lamp and the direction of current applied to the second portion of the cover bottom spaced apart from the lamp are controlled.

Accordingly, it is possible to eliminate problems of a degradation in the performance of the lamp and a reduction in the lifespan of the lamp caused by overheating of the lamp.

It is also possible to locally increase the temperature of the cover bottom under a low temperature condition. Accordingly, an enhancement in initial brightness can be achieved.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A backlight unit comprising:
    a cover bottom including a first portion, a second portion spaced apart from the first portion, and a third portion connecting the first and second portions, wherein the cover bottom includes a material having a Thomson's coefficient;
    a lamp arranged at the first portion of the cover bottom; and a current direction controller connected to the first and second portions and that controls a direction of current supplied to the cover bottom and flowing between the first and second portions of the cover, to control temperature in the backlight unit by inducing Thomson effect heating and cooling in the material having the Thomson's coefficient.

2. The backlight unit according to claim 1, wherein the first portion is the cover bottom portion arranged adjacent to the lamp, the second portion is the cover bottom portion spaced apart from the lamp, and the third portion is the connecting portion that connects the first and second portions.

3. The backlight unit according to claim 1, wherein the lamp has one of a straight shape, an L shape, and a U shape.

4. The backlight unit according to claim 1, wherein the lamp is arranged along at least one edge of the first portion that is spaced apart from the second portion.

5. The backlight unit according to claim 1, wherein the first portion has one of a straight shape, an L shape, and a U shape.

6. The backlight unit according to claim 1, wherein the current direction controller includes:
    a power source;
    a first diode and a first capacitor that are arranged in a first path;
    a second diode and a second capacitor that are arranged in a second path; and
    a first switch and a second switch that select between the first path and the second path to control the direction of the current supplied to the cover bottom.

7. The backlight unit according to claim 1, wherein the cover bottom is made from one of Fe, Cu, Pt, and Ag.

8. The backlight unit according to claim 1, wherein the lamp includes a cold cathode fluorescent lamp (CCFL) that includes a tube, first and second inner electrodes respectively arranged in the tube at opposite ends of the tube, and first and second voltage supply lines respectively connected to the first and second inner electrodes.

9. The backlight unit according to claim 1, wherein the lamp includes a light emitting diode (LED).

10. The backlight unit according to claim 1, further comprising:
   a light guide plate that guides light emitted from the lamp such that the light is reflected toward an LCD panel;
   a diffusion sheet that diffuses the light emerging upwardly from the light guide plate;
   a prism sheet that condenses the diffused light, and transmits the condensed light to the LCD panel; and
   a bottom-side reflection plate that upwardly reflects light transmitted to the cover bottom, to minimize loss of light.

11. A method for controlling a temperature of a backlight unit including: a cover bottom including a first portion, a second portion spaced apart from the first portion, and a third portion connecting the first and second portions, the cover bottom including a material having a Thomson's coefficient; a lamp arranged at the first portion of the cover bottom; and a current direction controller connected to the first and second portions and that controls a direction of current supplied to the cover bottom and flowing between the first and second portions of the cover bottom to produce Thomson's effect heating and cooling in the cover bottom in response to the direction of the current, the method comprising: controlling the direction of the flow of current such that the current flows in the cover bottom from a lower temperature side to a higher temperature side or from the higher temperature side to the lower temperature side, using the current direction controller in accordance with whether the Thomson's coefficient of the cover bottom is positive (+) or negative (−), upon a temperature gradient is generated in the cover bottom.

12. The method according to claim 11, wherein the backlight unit is in a low temperature state and the Thomson's coefficient of the cover bottom is positive, and wherein controlling the direction of the flow of current applied to the cover bottom includes directing the current to flow in a direction from the second portion to the first portion to cause the cover bottom to emit heat.

13. The method according to claim 12, wherein the cover bottom is made of one of Fe and Pt.

14. The method according to claim 11, wherein the backlight unit is in a high temperature state and the Thomson's coefficient of the cover bottom is positive, and wherein controlling the direction of the flow of current applied to the cover bottom includes directing the current to flow in a direction from the first portion to the second portion to cause the cover bottom to absorb heat.

15. The method according to claim 14, wherein the cover bottom is made of one of Fe and Pt.

16. The method according to claim 11, wherein the backlight unit is in a high temperature state and the Thomson's coefficient of the cover bottom is negative, and wherein controlling the direction of the flow of current applied to the cover bottom includes directing the current to flow in a direction from the second portion to the first portion to cause the cover bottom to absorb heat.

17. The method according to claim 16, wherein the cover bottom is made of one of Cu and Ag.

18. The method according to claim 11, wherein the backlight unit is in a low temperature state and the Thomson's coefficient of the cover bottom is negative, and wherein controlling the direction of the flow of current applied to the cover bottom includes directing the current to flow in a direction from the first portion to the second portion, to cause the cover bottom to emit heat.

19. The method according to claim 18, wherein the cover bottom is made of one of Cu and Ag.

20. The method according to claim 11, wherein the first portion has one of a straight shape, an L shape, and a U shape.

21. The method according to claim 11, wherein the lamp is arranged along at least one edge of the first portion that is spaced apart from the second portion.

22. The method according to claim 11, wherein the lamp has one of a straight shape, an L shape, and a U shape.

23. The method according to claim 11, wherein the lamp includes a cold cathode fluorescent lamp (CCFL) that includes a tube, first and second inner electrodes respectively arranged in the tube at opposite ends of the tube, and first and second voltage supply lines respectively connected to the first and second inner electrodes.

24. The method according to claim 11, wherein the lamp includes an LED.

25. The method according to claim 11, wherein the cover bottom is made form one of Fe, Cu, Pt, and Ag.

26. The method according to claim 11, wherein the current direction controller includes:
   a power source;
   a first diode and a first capacitor that are arranged in a first path;
   a second diode and a second capacitor that are arranged in a second path; and
   a first switch and a second switch that select between the first path and the second path to control the direction of current supplied to the cover bottom.

* * * * *